United States Patent [19]
Gell

[11] Patent Number: 4,602,147
[45] Date of Patent: * Jul. 22, 1986

[54] ROASTING TIMER

[76] Inventor: Harold A. Gell, 13720 Lockdale Rd., Silver Spring, Md. 20906

[ * ] Notice: The portion of the term of this patent subsequent to Jan. 25, 2002 has been disclaimed.

[21] Appl. No.: 687,987

[22] Filed: Dec. 31, 1984

Related U.S. Application Data

[63] Continuation-in-part of Ser. No. 555,659, Nov. 28, 1983, Pat. No. 4,494,314.

[51] Int. Cl.$^4$ .............................................. H05B 1/02
[52] U.S. Cl. ..................... 219/509; 219/497; 219/506; 99/323.7; 99/483; 99/493; 340/384 R
[58] Field of Search ............... 219/506, 509, 510, 497, 219/490; 99/323.7, 380, 483, 493, 327; 340/384 R, 384 E

[56] References Cited

U.S. PATENT DOCUMENTS 2,667,560 1/1954 Clark .................................. 219/506

Primary Examiner—M. H. Paschall
Attorney, Agent, or Firm—Harold Gell

[57] ABSTRACT

A timer for controlling the roasting of food products which create sounds during the roasting process through the explosive release of steam and gases generated by the cooking process. The system includes a transducer to sense sound and generate a control signal upon the cessation thereof.

6 Claims, 14 Drawing Figures

ROASTING TIMER

THE INVENTION

This invention relates to a means and apparatus for controlling the roasting of food products such as coffee beans and popcorn which generate noise through the explosive release of gas and water vapor during the cooking process. It is a continuation-in-part of U.S. patent application Ser. No. 06/555,659 filed Nov. 28, 1983 for "Coffee Roaster" and issued as U.S. Pat. No. 4,494,314 on Jan. 22, 1985.

BACKGROUND OF THE INVENTION

A number of food products such as coffee beans and popcorn generate noise as they are being cooked. This noise originates from the explosive release of steam and gases created by the heat of cooking and signals that the specific food particles emitting the noise have reached the proper degree of roast. This specification is directed to a timer for such food items and to simplify the presentation, coffee beans are treated herein as an exemplary food product.

Coffee, a beverage brewed from ground, roasted beans of the botanical species coffea originated in a part of the world now known as Ethiopia where wild Arabic trees were harvested to obtain the bean concealing cherries. The use of coffee as a beverage gradually spread from Ethiopia to include all of what was considered the civilized world by the early 17th century. Its popularity spread throughout the world in unison with mans advancement in global navigation. By the early 18th century the demand for coffee outstripped the ability of the native Arabica trees and plantations sprung up around the world in every country having a climate hospitable to the Arabica tree. Today, a coffee belt girdling the globe provides a great variety of coffees having regional qualities which attempt to meet the varied taste of the world population.

The characteristic flavor of coffee is affected not only by the point of origin and quality of the bean but also by the processing and roasting of the coffee bean. This provides an infinite variety of flavor characteristics which are further expanded by blending various varietal coffees and by brewing techniques.

The infinite variety afforded by coffee as a beverage is unfortunately a potential which has not been tapped except in a minimal way due to problems in marketing. The flavor of coffee is developed by roasting which causes the chemical reaction of pyrolysis within the beans that develops the coffee oils which create the essence and flavor of coffee. At the present time there is no easy, repeatable way to roast coffee in the home, therefore coffee is purchased preroasted and generally preground. This eliminates the possibility of individuals adjusting the coffee to suit their tastes in that they must be satisfied with products provided by commercial coffee roasters.

The fact that most coffee is sold preground or at least preroasted is an unfortunate circumstance. Coffee begins losing its flavor as soon as it is roasted. Ground coffee loses a significant amount of flavor within hours of being ground while roast coffee stored as whole beans will maintain its flavor reasonably well for approximately one week if sealed in an air tight container to minimize oxidation of the oils. Thus the coffee industry has what appears to be an unlimited variety of flavors that it can offer the public but due to marketing logistics, only a small segment of the potential may be tapped. Conversely, green coffee may be kept for years with little effect on its flavor content other than a mellowing such as is found in the aging of a fine wine.

Ideally then, the coffee industry should market its product as green coffee beans so that the individual consumer may blend and roast beans to meet his desires. Unfortunately, no satisfactory roasting device is available for the individual consumer whereby a small quantity of coffee for a single serving or single pot may be roasted.

A few coffee devotees manage to roast beans in iron skillets but this is a difficult task in that the skillet must be heated to a predetermined temperature and the beans introduced into the heated skillet which must be covered to maintain heat. The beans are agitated to ensure that they do not burn and when they have reached the proper degree of pyrolysis, the roasting must be quenched by dumping the beans onto a cool surface. At best, this method results in a product wherein the individual beans are each roasted to a different degree of roast, ranging anywhere from a light cinnamon roast to a heavy roast in a single batch.

Some improvements have been made to the pan roasting methods wherein a stirring device is fitted in the pan cover so that a person may continually stir the coffee in the pan while the cover is tightly maintained to ensure that the heat remains within the pan. This results in beans of a more uniform roast but the end product is still far from acceptable.

Pan roasting techniques for home use have a further disadvantage. In addition to the inconsistent degree of roasting achieved, the chaff coating of the coffee beans is loosened but not separated from the beans. Therefore, this undesirable part of the coffee bean remains with the beans and can only be separated by a winnowing technique. Furthermore the chaff tends to burn during the pan roasting process and results in a considerable amount of pungent smoke.

One attempt has been made to improve home roasting methods through the use of modern technology. This device is comprised of a hand-held hair dryer like device with a metal funnel over the hot air exhaust. The green beans are placed in the funnel and as the heated air passes through the beans, the operator gently tosses the beans within the funnel by up and down movement of the device. This particular home roaster is impractical for more than an ounce of beans at a time and the operator must continually shake the device which becomes very fatiguing. Also, the chaff associated with the beans is blown around the kitchen or area where the roasting is accomplished.

OBJECTIVES OF THE INVENTION

The primary objective of the present invention is to provide a roasting control means for controlling the roasting or cooking of food products such as coffee beans and popcorn which emit sounds caused by the explosive release of steam and gases during the cooking process.

It is a further objective of the present invention to provide a sound responsive control means for regulating the cooking of food objects which emit sounds during the roasting process as a function of the emitted sounds.

In view of the obvious inability of prior techniques to tap the full potential of flavors available in the various coffees produced throughout the world by providing a relatively easy method of home roasting, it is a primary objective of the present invention to provide a device with which an individual consumer may roast a small amount of coffee to a predetermined degree of pyrolysis, cellulose carbonization and caramelization.

It is a further objective of the present invention to provide a roasting means whereby a small quantity of coffee may be automatically roasted to a predetermined degree and quenched.

A further objective of the present invention is to provide a coffee roasting device wherein coffee beans are automatically and continually agitated in a fluidized bed within a roasting chamber as they are heated via convection and radiant means.

A further objective of the present invention is to provide an automatic coffee roaster wherein roasting time may be preset by an operator to obtain a predetermined degree of roast.

Another objective of the present invention is to provide a coffee roasting device wherein coffee roasting time is automatically controlled by an optical sensing means responsive to the carbonization of the bean surface and the amount of oil thereon.

A further objective of the invention is to provide an automatic coffee roaster which compensates for ambient temperature in the roasting process.

A still further objective of the present invention is to provide an automatic coffee roasting device wherein roasting is controlled in response to the popping sounds created by beans as moisture therein expands during pyrolysis.

A further objective of the present invention is to provide a home coffee roasting device which removes chaff from coffee beans and traps the chaff in a collector which prevents contamination of the atmosphere by the chaff.

The foregoing and other objectives of the invention will become apparent in light of the drawings, specification and claims contained herein.

SUMMARY OF THE INVENTION

This invention is directed to a cooking control method and apparatus for food products which emit sounds through the explosive release of steam and gases generated by the cooking process. The system includes automatic control circuitry which is enabled by the detection of the audio energy created by the cooking food products and which provides a control signal upon the cessation of the noises generated by the cooking process. This control signal may be used to energize an indicator but in preferred embodiments, the control signal is used to terminate application of cooking heat.

By way of example, this specification is directed to a device for roasting coffee, one of the food products for which the noise responsive timing means is designed.

A coffee roasting method and apparatus are presented hereby wherein a heating unit heats the walls of an oven which serves as a coffee roasting chamber and air which passes through the roasting chamber to continually mix coffee beans therein as they are heated by radiant energy from the oven surfaces and through convection via the heated air which creates the fluidized bed. Control means are provided to terminate the heat source when the degree of pyrolysis, carbonization and caramelization desired is reached while unheated air currents continue to maintain the fluidized bed to dissipate the residual heat in the beans and the oven surfaces to thus quench the roasting process. Once the oven and beans are quenched, means are provided to terminate the air currents creating the fluidized bed and the coffee beans are removed from the oven for grinding and brewing.

The means for controlling the duration of roast or the amount of pyrolysis, carbonization and caramelization which occurs and the subsequent quenching may be any one of a plurality of controls ranging from manually operated electrical switches through mechanical timers, electronic timers and associated relays and solid state switching devices. Embodiments are also contemplated wherein roasting is controlled by automatic optical comparison means which determine the degree of pyrolysis, carbonization and caramelization as a function of the surface color of the bean and surface oil. A further embodiment is also contemplated wherein roasting time is measured as a function of the crackle of beans which occurs during the roasting process.

Chaff separated from the beans during the roasting and quenching process is transported from the oven into a collection filter from which it may be removed as accumulation demands.

DESCRIPTION OF THE INVENTION

Figure 1:
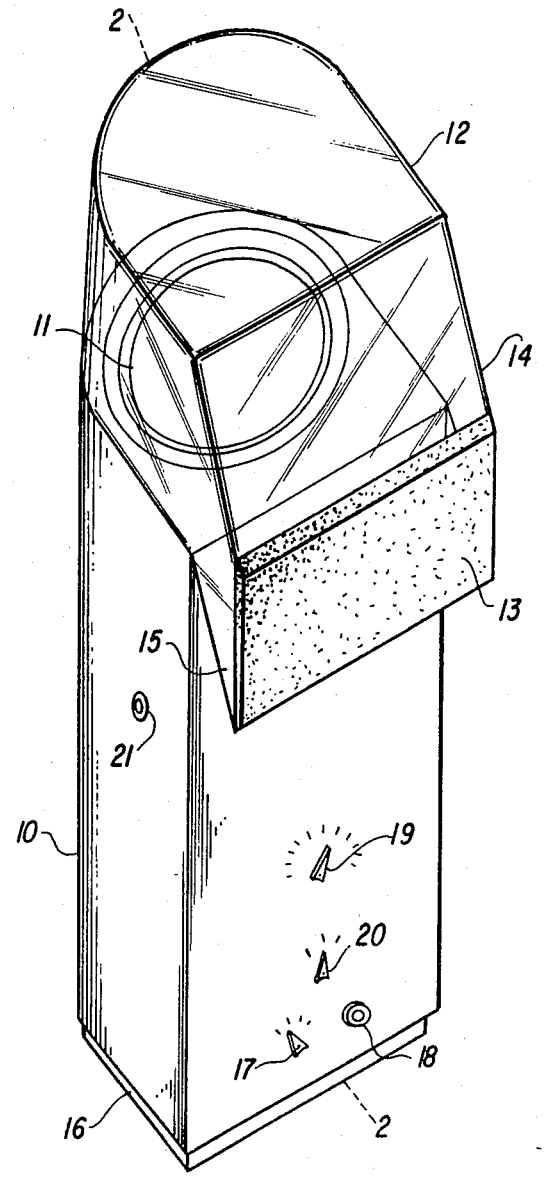
FIG. 1 is a front three-fourth view of a preferred embodiment of the coffee roaster.

FIG. 1 is a front three-fourths view of a preferred embodiment of the coffee roaster. It is comprised of an oven housing 10 which contains the oven chamber 11 which is a metal drum with an open top through which the oven is charged with coffee beans. A clear plastic chaff trap 12 fits over the top of the housing 10 and functions as a cover for the open top of oven chamber 11. The chaff trap is removed when the oven is being charged with coffee beans or when roasted beans are removed.

A filter medium 13 covers the discharge end of the exhaust duct 14 of the chaff trap. The exhaust duct is angled down so that chaff blown out of the top of the oven chamber 10 will be carried toward the filter medium 13 where it will collect in the angled collection portion 15 of the chaff trap.

The housing 10 has a base section 16 which is dimensioned smaller than the primary portion of the housing and openings are provided on the underside of the primary portion of the housing around the upper perimeter of the lower section 16. The openings are the means through which the convection heater and fluidized bed blower draws air that is heated and passed through the oven chamber and out the chaff trap.

The heater, blower and controls are within the housing 10 and operator controls and indicators are mounted on the surface thereof. In the embodiment illustrated in FIG. 1, a function selection switch 17 is provided in the lower left corner of the control panel side of the housing 10. This switch has an off position which disconnects current from the oven, an automatic position which energizes the automatic controls of the oven, a manual roast position, and a quench position. The manual roast position and quench positions of the function selector switch 17 bypass the automatic controls and are provided so that the oven may be used in a totally manual mode. To assist in operating the device in a manual mode, a heater warning lamp 18 is provided adjacent to the function selection switch. This is a Red lamp which is illuminated whenever the heating elements of the oven are on.

A ten position rotary switch 19 selects the roast desired. The switch controls the circuitry within the oven that is calibrated to provide any one of ten different roasts. The roasts available via the selection switch 19 are:

1. Cinnamon roast—light brown and dry beans;
2. American roast—medium brown and dry beans;
3. City roast—medium dark brown and dry beans;
4. Light french roast—medium to dark brown with small oily spots;
5. Full city roast—dark brown with oily spots;
6. After dinner roast—dark brown and somewhat oily beans;
7. Italian roast—dark brown and oily beans;
8. French roast—very dark brown and oily beans;
9. Expresso—almost black and oily beans;
10. Heavy roast—black and very oily beans.

Coffee beans are available in a variety of densities and sizes which have a direct bearing of the amount of heat energy that is required to achieve the selected roast. To accommodate for the density and size variations in beans, a bean selection switch 20 enables the roaster to be calibrated for the specific type of bean being roasted. In the embodiment illustrated in FIG. 1, this control is comprised of a three position switch for adjusting the oven for hard, dense beans, average beans, or soft, light beans.

Automatic operation of the coffee roaster illustrated in FIG. 1 is accomplished by removing the chaff trap 12 and charging the oven chamber 11 with green coffee beans. The chaff trap 12 is then placed on top of the oven housing 10. The roast is selected via selection switch 19 and the oven is programmed for the type of beans to be roasted by positioning switch 20. The function selection switch 17 is then rotated from off to automatic and the roasting process begins. The heater indicator 18 is illuminated and remains on until the beginning of the automatic quench cycle. When the lamp 18 is extinguished and air is still passing through the oven, the oven is in the quench cycle. When the quench cycle is completed, the blower stops and power is automatically disconnected from the oven. To start a new roasting cycle, the function switch 17 must be turned to the off position and then back on to automatic. However, if additional roasting is desired, the function switch 17 may simply be turned to the roast position. With the function switch in this position, the oven will remain on until turned off via the function switch.

When manual operation of the oven is desired, the function switch 17 is placed in the roast position and the operator observes the beans through the transparent chaff trap 12. When the beans have reached the desired degree of roast, function switch 17 is turned to the quench position and the heater is shut off but the blower remains active. Once the beans are quenched, the function switch 17 is rotated to the off position.

When the roast and quenching cycles have been completed, either automatically or manually, the beans are removed from the oven by removing the chaff trap 12 and pouring the roasted beans out of the oven.

The necessity to pick up the roaster assembly to pour roasted beans out of the oven dictates that the roaster should be small enough so that a person may grasp it easily and manually rotate the device. This is readily accomplished in the embodiments illustrated in FIGS. 1 and 2 for roasters having the capacity of up to two pounds of green beans. However, when the invention is applied to roasters having capacities in excess of two pounds, the roaster is supported in a gimbal assembly with supporting pivot points dimensioned to fit within recesses 21 provided at either side of the housing 10. In these larger applications of the invention, the supporting gimbal assembly may be provided by any one of a number of structural assemblies such as A frames etc. which will support a rotatable fitting adapted to cooperate with recess 21 which is positioned above the midline of the oven housing so that the whole assembly may be rotated about the pivot point to facilitate dumping of the charge.

Figure 2:
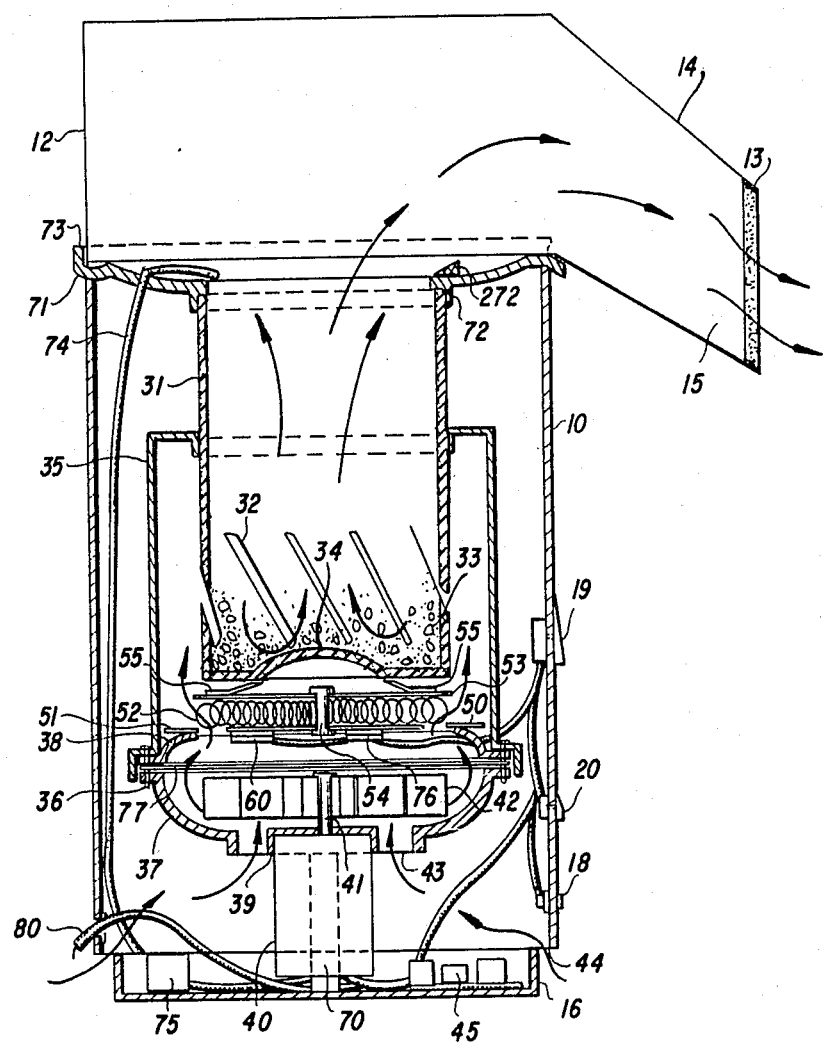
FIG. 2 is a sectional view of the coffee roaster taken along the line 2—2 and illustrating the oven, heating means and convection current generating means.

FIG. 2 is a cutaway view of the roaster illustrated in FIG. 1 taken along the line 2—2. This embodiment is ideally dimensioned for home use or use in a small coffee shop where the quantity of green beans to be roasted in any given batch ranges from a single tablespoon to two pounds. Ideally, a home use roaster will have an oven chamber, 31 of FIG. 2, approximately 70 millimeters in diameter and 80 millimeters high. A roasting drum or oven 31 of these dimensions is most efficient for roasting a quantity of beans ranging from a tablespoon to a quarter pound with the optimum charge being two ounces. Increasing the oven drum 31 dimensions to 140 millimeters in diameter by 160 millimeters high provides a roaster wherein the range of green bean charge is from one-fourth pound to two pounds with the optimum charge being one pound.

The dimensions of the roasting chamber or drum 31 are the controlling factor for the dimensions of the remaining elements of the system and therefore, the various dimensions of the coffee roaster, whether the roaster be designed for a maximum charge of one-fourth pound or two pounds, or more will be relative to the roasting chamber 31.

Roasting chamber 31 is a cylindrical oven chamber fabricated from a material such as stainless steel. The top is opened and has a diameter approximately equal to the diameter of the closed bottom. However, this relationship is not critical and the opened top of the roasting chamber 31 may be slightly larger or slightly smaller than the bottom.

A plurality of angled slots 32 are arranged about the bottom circumference of the oven chamber 31. They are ideally formed by cutting diagonal slots in the steel walls of the chamber and bending the metal on the upper side of the slot toward the interior of the chamber to create a louvered effect. This acts as a deflector through which air may be forced into the chamber to create a swirling flow which will create a fluidized bed if the chamber has a charge of coffee beans 33.

The swirling air entering the diagonal louvers mixes the coffee beans and causes them to rotate within the chamber so that any one surface of any bean will not remain in constant contact with the walls of the oven chamber 31. This prevents scorching of the beans and ensures even roasting. A dome 34 may be formed in the center of the bottom of the roasting chamber 31 to enhance the mixing action of the swirling air entering through louvers 32. The oven chamber 31 has an outer jacket 35, also formed from a material such as stainless steel, which creates a plenum about the lower half of the oven drum proper and encases the louvered area. This plenum forming shell is fastened via screws or other means 36 to a blower housing comprised of a lower section 37 and an upper section 38. The upper section 38 is subjected to relatively high temperatures and forms part of the oven plenum and therefore should be fabricated from a material such as stainless steel. The lower section, 37 is not subjected to as high a temperature environment and therefore may be fabricated from a material such as a high temperature plastic.

The lower section 37 of the blower chamber includes a recessed central area 39 adapted to hold and support blower motor 40 which includes a shaft 41 that supports and rotates a centrifugal impeller 42. The centrifugal impeller 42 draws air up through the openings 43 that are positioned about the motor supporting aperture of the lower half 37 of the blower housing so that air will be drawn through the slots 44 located between the bottom section 18 of the oven housing and the primary oven housing 10. This causes cooling air to flow over the control circuitry contained in the electronic modules 45 and over the exterior surfaces of the motor 40.

The centrifugal impeller forces air towards the outer walls of the blower housing 37 and out through the opening provided by the upper blower housing half 38. The upper blower housing half 38 is a curved, circular member having a relatively large opening in the center across which a heater element mounting board 50 is placed. The heater housing mounting board 50 contains a plurality of crescent shaped openings 51 dimensioned to match the outer edges of the opening of the upper blower housing 38 so that air passing through the blower housing is forced through these openings 51. An electrical heating element 52 is positioned over the openings 51 of the heater mounting board so that the air passing out of the blower chamber will be heated thereby.

A disc, 53 is secured to the heater element mounting board 50 by a rivet or similar means 54 to secure the assembly. Spring biased means 55 conducts heat energy from the heating element to the bottom of the oven and clamps the heating assembly in place.

In operation, the coffee beans 33 contained within the oven chamber 31 are roasted by air which is forced through the heating element 52 and through the louvered slots 32 of the oven chamber 31 at a flow rate which creates a fluidized bed of the coffee beans. In addition to the convection heating caused by the forced hot air flowing through the coffee beans and creating a fluidized bed thereof, further heating and roasting of the coffee beans is provided by radiant heat energy conducted through the walls of oven chamber 31.

The roast selector switch 19, function selection switch 17, bean selection switch 20 and heater indicator 18 and the associated wiring therefore remain relatively cool due to the circulating air entering through openings 44. A temperature control thermostat 60 is mounted on the underside of the heating element support board 50 and automatically turns the heating element on and off to maintain a preset temperature calculated to maintain the temperature within the green bean charge at a predetermined level of approximately 400° F. 400° F. or 204° C. is the optimum roasting temperature regardless of the roast desired. This temperature ensures uniform pyrolysis throughout the charge without undue surface charring, uneven roasting or excessive smoke production. Roasting temperature limits are fairly broad however and satisfactory results can be obtained if the oven temperature is maintained within a range between approximately 300° F. and 500° F. However, as oven temperature increases, the roasting time decreases and the chance of scorching increases along with an increase in smoke.

The oven chamber, plenum, heater, and blower assembly along with the blower motor are supported within the oven housing by a pair of legs 70 which are secured to the bottom, 18, of the coffee roaster housing and engage receiving means in the bottom of the lower blower housing 37. Stability is provided by an upper housing closure and chaff trap support ring 71. This ring has a central opening surrounded by a flange member 72 dimensioned to receive the upper portion of oven chamber 31 and firmly clamp the oven and blower assembly against supports 70 to securely hold the elements within the roaster housing.

The upper surface of ring 70 slopes toward the opening in the center so that any coffee beans that are inadvertently blown out of the oven, will slide back into the oven chamber.

The chaff trap 12 rests on top of ring 71 and is maintained in position by a flange 73 which has a cutout portion over which the exhaust duct 14 passes. The end of the exhaust duct 14 is fitted with a filter media 13 which may be fabricated from material such as a metallic screen, flattened expanded metal elements or a fiberglass filter mat. The filter allows air to exit the oven in a relatively unimpeded fashion while trapping chaff that is removed from the beans during the roasting process. The trapped chaff drops an area 15, immediately behind filter 13 when the blower is turned off and is removed by shaking the trap after it is removed from the oven assembly over a suitable receptacle with the exit portion of duct 14 raised above the entrance area.

The chaff trap 12 may be fabricated from any material which is resistant to moderately high temperatures, but in a preferred embodiment it is fabricated from a transparent plastic so that an oven operator may observe the beans.

If the automatic roasting control system includes an optical sensing means, it is provided by a fiber-optic conduit 74 which, dependent upon the system used, will illuminate the roasting chamber and return radiant energy therefrom or simply return radiant energy from the roasting chamber to the optical data processing circuit 75.

To comply with Underwriter Laboratory standards, a thermal cutout 76 is mounted on the underside of the heater mounting board 50. This device permanently opens the circuit to the heater element in the event that the temperature exceeds a predetermined safe value. The temperature control thermostat 60 is calibrated to open at 150° C. in a preferred embodiment to regulate the internal oven temperature so that it will maintain a constant 204° C. or 400° F. The thermal fuse or cutout is calibrated to permanently open the circuit at 214° C. or 417° F. so that the unit temperature will meet Underwriter Laboratory specifications. The thermostats are located below the heating element and in the air flow path so the temperature sensed is less than the actual oven temperature. For instance, 150° C. or 302° F. at the thermostat location in the roaster produces an oven temperature of 400° F. or 204° C.

A thermally insulating gasket or spacer 77 may be provided between the upper blower housing 38 and the lower blower housing 37 to insulate the lower blower housing from the extreme heat of the upper blower housing so that the lower blower housing may be manufactured from a less expensive material.

Electrical power to energize the blower motor 40 and heating element 52 as well as the control circuitry is provided by an electrical input cable 80.

Figure 3:
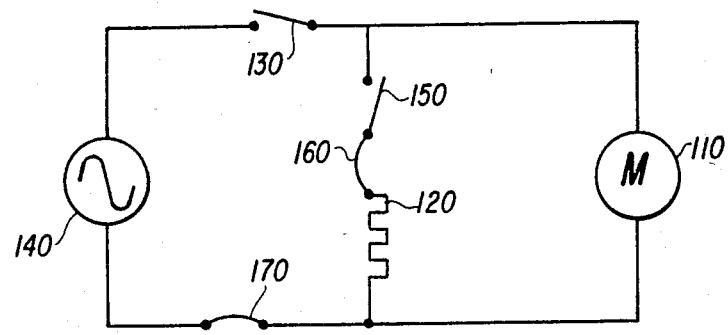
FIG. 3 is a simplified schematic illustrating the basic control means for the convection current generator and heater means.

FIG. 3 is a simplified schematic illustrating the basic control means for the convection current generating means or blower motor 110 and heating element 120. A main power switching means 130 provides controlled application of electrical current from the source 140 to the motor 110 and the heating sub-circuit comprised of heating element 120 and control switching means 150.

In its simplest form, as illustrated in FIG. 3, the coffee roaster includes a blower motor 110 which creates convection currents that stir the coffee beans while heating element 120 which is controlled by switching means 150 heats the oven walls and the air current generated by the blower motor 110. To operate the coffee roaster embodying this basic control circuit, switch 150 is closed to enable the heating element 120 and after a green bean charge is placed in the oven chamber, switch 130 is closed to energize the blower 110 and heater 120. When the operator determines that the beans have reached a desired roast, switch 150 is opened. This turns off the heating element 120 while the blower motor 110 continues to function. The blower motor now forces cool air around and through the oven chamber to quench the oven and roasted beans. After the beans are quenched and the oven chamber walls have been cooled sufficiently to prevent scorching of the beans, switch 130 is opened and the roasted beans may be removed from the oven chamber.

During the roasting process, the oven temperature is maintained in the proper range by thermally responsive switch 160 which opens the circuit to the heating element 120 when the temperature reaches a predetermined maximum level and closes to complete the circuit to the heating element when the temperature reaches a predetermined minimum level. If desired, this control may be eliminated, in which case the oven temperature will vary proportionally with the ambient temperature and roasting time must then be altered as a function of ambient temperature.

A safety thermal element 170 is provided in the primary power circuit to disconnect all power to the coffee roaster in the event that the temperature controlling element 160 fails and the temperature within the oven exceeds a predetermined safe value. The thermally responsive element 170 is preferably in the form of a thermal fuse which opens the circuit upon reaching a set value. The device will not reclose and the circuit can only be restored to an operating condition by replacing the safety thermal cutout 170.

Figure 4:
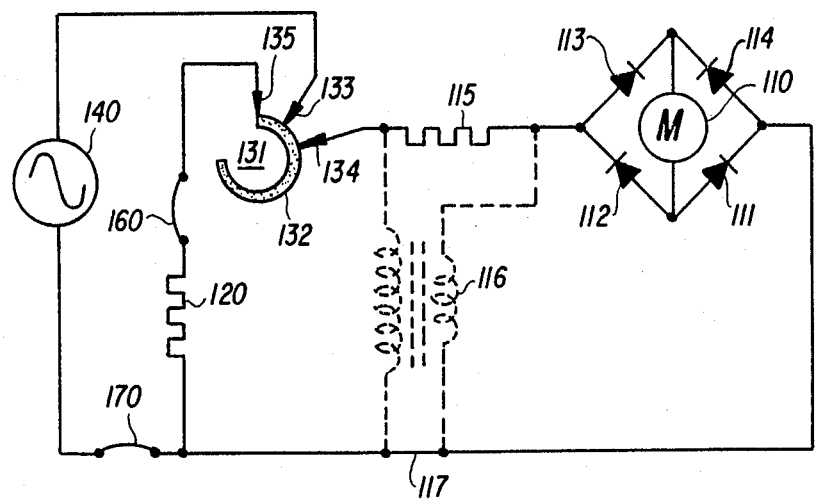
FIG. 4 is a schematic diagram illustrating a mechanical timer control for the coffee roaster.

FIG. 4 schematically illustrates the electrical circuit for an embodiment of the coffee roaster wherein roasting and quenching times are automatically controlled by a mechanical timing switch 131 which may be driven by a spring motor or electrical clock type motor. In a preferred embodiment, a spring motor is utilized to drive contact segment 132 in a clockwise direction so that power will be applied to the heating element 120 and motor 110 at the beginning of the cycle and as the motor unwinds, current will be sequentially removed from the heater element 120 and then the motor 110. For instance, as illustrated in FIG. 4, sector contact 130 has rotated to a point where contact 135 is about to be disconnected. This will cause current to cease flowing through the temperature controlling thermal switch 160 and thermal element 120 but current will continue to flow through contact 133 and the sector contact 132 to motor 110 via contact 134. As the sector contact 132 continues to rotate clockwise, contact 133 eventually opens and disconnects current to the motor 110, thus completing the quenching cycle. In a preferred embodiment, the sector contact 132 is manually rotated by an operator in a counter clockwise direction to wind the spring motor which, from a point of maximum counter clockwise rotation, provides a duration of time long enough so that with the heat generated by heating element 120, the coffee in the oven will be roasted to a heavy dark roast. Thus by controlling the amount of counter clockwise rotation given to sector contact 132, an operator may control the degree of roast of the charge in the oven. The quenching time remains a constant and is dictated by the distance along the sector contact that electrical contact 133 is separated from electrical contact 135.

In the embodiment illustrated in FIG. 4, an oven temperature safety element 170 is provided as in FIG. 3.

To provide a more economical coffee roaster, the embodiment of FIG. 4 may utilize a relatively low voltage DC motor 110. This is accomplished by placing a bridge rectifier comprised of diode rectifiers 111, 112, 113 and 114 in the circuit such that the alternating current provided by source 140 will be rectified before being applied to motor 110. A voltage dropping resistor 115 is placed in the circuit for the bridge rectifier so that the resultant DC potential applied to the motor is of the proper range.

The voltage dropping resistor 115 may be in the form of a heating element. In that case, it is placed within the air heating chamber of the oven along with heater 120 and assists in heating the convection currents and the oven walls. The heat generated by voltage dropping resistor 115 is not enough to roast coffee however so that when heater 120 is de-energized, air currents passing through the oven will be heated by resistance 115 but will nevertheless be relatively cool so that quenching will occur.

The need for a voltage dropping resistor 115 may be eliminated if a step down transformer 116 is inserted in the circuit in place of resistance 115. This embodiment permits the use of a low voltage DC motor without the penalty of the increased temperature convection currents during the quenching cycle. In FIG. 4 it is illustrated by transformer 116 shown in dashed lines. If the transformer is incorporated in the circuit, dropping resistance heating element 115 and circuit connector segment 117 are removed so that the bridge rectifier and motor are coupled to the AC power source only via the step down transformer 116.

In the various embodiments illustrated, temperature controlling thermostat 160 is set to open at 150° C. and the blower forces air through the heating element at a rate which will result in the oven chamber maintaining a temperature of 400° F. or 204° C. The safety thermal fuse 170 is calibrated to open at 214° C. or 470° F. to prevent the oven chamber from exceeding a temperature of approximately 270° C. or approximately 518° F.

When the oven temperature controlling thermostat 160 is calibrated to open at 150° C. or 302° F., the resultant 400° F. or 204° C. oven temperature requires a roasting time of between 5 and 9 minutes 30 seconds and a quenching time of between 1 and 2 minutes, depending upon whether a heating element is used to reduce the motor voltage. If heating element 115 is incorporated, approximately 2 minutes is required to quench the roasted bean charge and lower the oven temperature to a safe level of 180° F. or 82° C. When a transformer 116 is used in lieu of the heating element type voltage reduction means, the quenching air is cooler and quenching time is reduced to approximately 1 minute. Roast overshoot during quenching is also reduced when a transformer is used in lieu of a heating element type voltage reduction means.

With the temperature controlling the thermostat 160 calibrated to open at 150° C., roasting time required for an average charge is between 5 and 9 minutes 30 seconds with the short, 5 minute roasting time producing a light cinnamon roast and the 9 minute 30 second roasting time producing a heavy roast. Thus the timing mechanism for switch 131 should be adjusted so that when the sector switch 132 is turned to the maximum counter clockwise position, 10 minutes 30 seconds will be required if a step down transformer 116 is used and 11 minutes 30 seconds if the voltage reducing resistor heating element 115 is used. Contacts 135 and 133 are spaced apart along the path of segment contact 132 so that the time elapsed between opening of contact 135 and the opening of contact 132 will be either 1 or 2 minutes, depending upon what type of voltage reduction mechanism is incorporated.

The operator control by which the operator winds the spring motor and rotates sector contact 132 may be in the form of an indicating knob such as 19 illustrated in FIG. 1 which cooperates with a scale of from 1 to 10 with the extreme counter clockwise position providing a roasting time of 9 minutes 30 seconds before quench to produce a dark roast and the first position producing a roasting time of 5 minutes to produce a light, cinnamon roast. Each increment between the light cinnamon roast and heavy dark roast represents a roasting time of approximately 30 seconds.

If shorter roasting times are desired, temperature controlling thermostat 160 may be adjusted to open at 177° C. or approximately 350° F. This results in an oven temperature of 450° F. or 330° C. which results in a significantly shorter roasting time. If this option is selected, the roasting time for a light cinnamon roast is approximately 3 minutes 30 seconds and 5 minutes are required for a full, heavy dark roast. In this embodiment, the increments illustrated in FIG. 1 for control 19 provides 10 second intervals. The shorter roasting time and reduced interval times cause this embodiment to be more sensitive to the condition of the green bean charge and ambient temperature and thus precise roasts are not as easily obtained as in the embodiment providing the longer roasting times. Also, the higher roasting temperatures result in the roasting process producing a significant amount of smoke and render its use within the home as unacceptable unless a venting means is provided. On the other hand, when the lower roasting temperatures are used, no significant smoke is generated when the oven charge is less than 2 ounces and the roaster may be utilized within the home without the need for ventilation.

Figure 5:
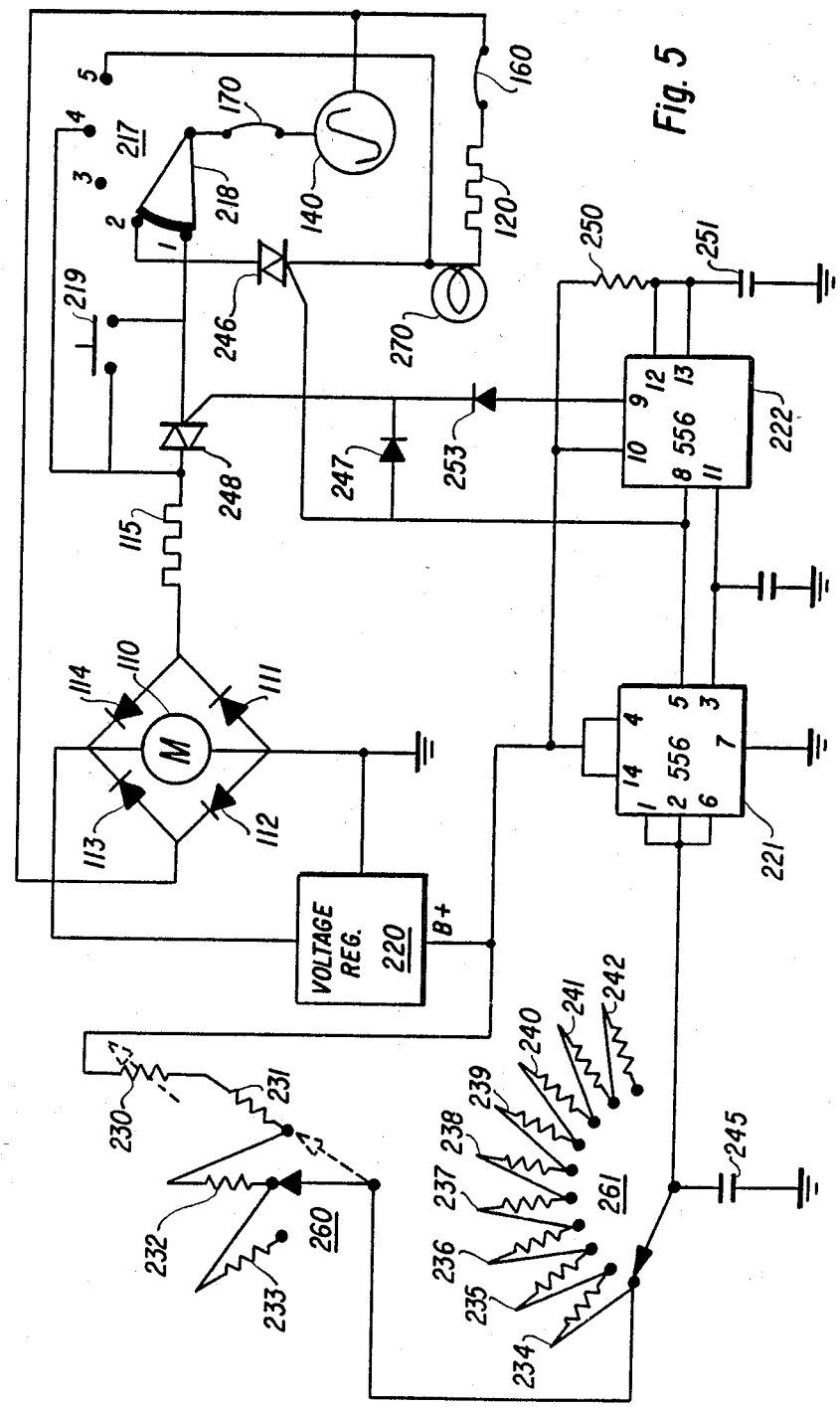
FIG. 5 is a schematic diagram illustrating an electronic timer control for the coffee roaster.

FIG. 5 schematically illustrates an electronic timer control means for the coffee roaster. In this embodiment, a master control switch 217 selectively couples an AC power source 140 to the roaster control circuitry, blower motor 110 and heater 120. A safety thermal cutout 170 is provided in series in the circuit between the power source 140 and the armature or movable sector contact 218 of switch 217. The sector contact 218 is dimensioned to bridge two contacts at a time to provide a plurality of different types of operation. As switch 217 is illustrated, the coffee roaster control circuitry is set in the fully automatic mode with roasting commencing upon depression of push-button switch 219.

With selector switch 217 positioned as illustrated in FIG. 5, when push-button switch 219 is depressed, current is supplied via a voltage reduction resistance 115 to the bridge rectifier comprised of diodes 111 through 114. (The voltage reduction resistance 115 may be replaced by a step down transformer as illustrated in FIG. 4 as previously explained).

The DC voltage provided by the bridge rectifier is applied to blower motor 110 and to the voltage regulator 220.

Voltage regulator 220 provides a constant DC voltage for the integrated circuit timers 221 and 222 which may be type 555 timers or, to minimize hardware, a dual timer such as type 556 may be utilized. In the illustrated embodiment, voltage regulator 220 is an integrated circuit type 7815 which provides a regulated positive 15 volts.

The first timer 221, is configured so that it will produce a positive pulse at output pin 5 upon initialization of power to the system. This positive pulse has a duration controlled by resistances 230 through 242 and capacitor 245. The positive output pulse from timer 221 gates on triac 246 so that AC current from source 140 may be applied through heating element 120 and temperature control thermostat 160. In some applications, it may be desirable to use a relay instead of a triac to more economically control current to a heating element having high current requirements.

The positive output pulse from timer 221 is also applied via diode 247 to the gate of triac 248 which is in parallel with push-button switch 219. It couples AC current to the bridge rectifier to energize the motor 110 and voltage regulator 220 after push-button switch 219 is released.

The output pulse of timer 221 is also coupled directly to the trigger input pin 8 of timer 222 which is configured to produce an output at pin 9 in response to a drop in the input trigger. The pin 9 output of timer 222 goes positive immediately upon occurrence of the drop in the output of timer 21 and this positive pulse lasts for a duration control by resistor 250 and capacitor 251. It is applied via isolation diode 253 to the control electrode of triac 248. Because of the rapid switching time of the timers, triac 248 remains conducting as the current source at its control electrode is switched from the output of timer 221 to timer 222. Thus the circuit will not shut down due to lack of current flow through the bridge rectifier and timer 221 will not be reset and reinitialized. Timers with a slower response time may be used and in some cases it may be desirable to use relays instead of SCRs due to their relatively slow reaction time.

When the output of timer 221 drops, triac 246 is turned off and current flow through the heater 120 ceases. Current flow continues through triac 248 as previously explained and therefore the blower motor 110 continues to function and provides air flow for the quench portion of the roasting cycle until timer 222 times out and its output drops. When this occurs, triac 248 is turned off and current flow to the blower motor 110 and voltage regulator 220 ceases. The system is thus shut down until push-button switch 219 is depressed and then the complete cycle will repeat.

If the embodiment illustrated in FIG. 5 is equipped with a temperature controlling thermostat 160 which will cause the oven temperature to hold constant at 400° F., the timing circuit for the roasting portion of the cycle comprised of resistors 230 through 242 and capacitor 245 may be comprised of elements having values which will produce roasting times ranging from 4 minutes 50 seconds through 9 minutes 40 seconds. This may be provided by utilizing a capacitor of 30 MF for capacitor 245 in combination with a primary timing resistor 230 of 8.2 Megohms, a trimmer resistor 231 of 560K ohms, bean and load adjustment resistors 232 and 233 of 33K ohms each and roast interval resistors 234 to 242 of 910K ohms each. With these component values, the positive output pulse of timer 221 will be 4 minutes 50 seconds when the function selector switch 260 is positioned in the extreme clockwise position as illustrated by the dotted contact and the roast selection switch 261 is in the extreme counter clockwise position as illustrated. This creates an RC time constant for controlling timer 221 which is comprised of the 30 MF capacitor, the 8.2 Megohm resistor 230 and the 560K ohm trimmer resistor 231 which will cause production of a timing pulse of 289 seconds or approximately 4 minutes 50 seconds. Each position of the roast selection switch 261 adds an additional 910K ohms to the timing circuit and thus an additional 30 seconds are added to the roasting time for each position of selector switch 261 as that switches rotor is stepped in a clockwise direction. Switch 261 and resistors 234 through 242 may be replaced by a potentiometer of equivalent range.

Resistors 232 and 233 each add an additional 330K ohms to the timing circuit and thus the output pulse may be adjusted by 10 second increments. For instance, with the rotor of function selection switch 260 positioned at the center contact as illustrated in FIG. 5 and the roast selection switch 261 also positioned as illustrated, a roasting time of approximately 5 minutes will be provided by a 5 minute output pulse from timer 221. If the function selector switch 260 is rotated to the right one position, the roasting time will be reduced by 10 seconds to 4 minutes 50 seconds and if the switch rotor is rotated to the left hand position, the roasting time will be increased 10 seconds or to 5 minutes 10 seconds. This 10 second variation will be provided for each of the various time durations selected by the roast selection switch 261 so that the combination of the two switches and their associated resistors provide timing adjustments of 10 second intervals from 4 minutes 50 seconds through 9 minutes 40 seconds.

The 10 second variances provided by the function selection switch 260 are provided to adjust system operations for variances in the oven charge so that a roast selected by the roast selection switch 261 will be the desired roast. For instance, when a relatively small charge is placed in the oven, much of the convection heat is lost becaus of the rapid passage of air through the light charge of beans. Thus the actual roasting temperature is slightly lower and the bean roasting time for any desired roast must be increased by 10 seconds above the norm. On the other hand, when a heavy charge of beans is placed in the oven, more heat is extracted from the heated air currents flowing through the oven and the oven temperature is slightly higher than normal. Thus the time for roasting a large charge must be reduced approximately 10 seconds for any given roast and this is accomplished by placing the function switch rotor in the extreme right hand position.

The function selector switch 260 also serves to adjust roasting times for different qualities of beans. For instance, when extremely dense beans are to be roasted, approximately 10 seconds additional roasting time is required for any given roast selected by switch 261 so for dense beans, the function selection switch is placed in the left hand position. Conversely, when light beans are roasted, less heat is required to reach the desired roast so the function selector switch 260 is placed in the extreme right position to reduce roasting time for a selected roast by 10 seconds.

If temperature controlling thermostat 160 is not incorporated in the FIG. 5 embodiment, resistor 230 may be in the form of a manually variable resistance to permit the timing circuit to be calibrated for ambient temperature or 230 may be a temperature responsive means such as a thermister which will automatically alter roasting time as required by ambient temperature variations.

Quenching time is controlled by resistor 250 and capacitor 251. If a heating element 115 is used to drop the input voltage, a 2 minute quenching time is needed. In this case, capacitor 251 may be a 10 MF capacitor and resistor 250 should be 11 Megohms. If a step down transformer is used instead of a heat producing resistance, only 1 minute will be required for quenching. In this instance, if capacitor 251 is 10 MF, then resistance 250 should be 5.6 Megohms.

If the oven is equipped with the control circuitry embodiment illustrated in FIG. 5, it may be operated in a manual mode via switch 217. When switch 217 is positioned as shown in FIG. 5, the rotor sector 218 connects contacts 1 and 2 to the power source. When the rotor is positioned so that the contact sector engages pins 2 and 3, the system is disconnected. No current is applied to pin 1 and therefore, closure of push-button switch 219 will not initialize the system in the automatic mode as previously explained. When sector 218 is positioned so that it engages pins 3 and 4, power is applied directly to the voltage reduction means 115 and the bridge rectifier to energize motor 110. With switch 217 in this position, voltage is applied to voltage regulator 220 and the automatic timing sequence of timers 221 and 222 is initiated. However, triacs 246 and 248 have no effect on the circuit because they are disconnected from the power source at pins 1 and 2 of switch 217. Thus the operation of the timing circuits is meaningless and the blower motor 110 will function as long as the switch remains in that position. When rotor 218 is rotated in the extreme clockwise position, it contacts pins 4 and 5 to provide current directly to the heating element 120 as well as the blower motor via the voltage reduction means as previously explained for manual operation when the sector 218 engages pins 3 and 4.

Thus, the circuit illustrated in FIG. 5 provides a manual mode of operation wherein an operator may rotate sector contact 218 of switch 217 to the extreme clockwise position and simultaneously energize both the blower motor 110 and heating element 120. When the beans have reached a desired degree of roast, the operator may rotate sector contact 218 of switch 217 one position to the left to turn off heating element 120 while the motor 110 remains energized to provide a quenching function. After the beans are quenched, sector 218 may be rotated one step further to the left to turn off the system.

If desired, a special off position may be provided for switch 217 by providing a half step detente so that sector contact 218 will engage only pin 3 in the off position.

A lamp 270 may be included in the circuit for heating element 120 to provide a visual indication when the heating element is on to assist in both manual and automatic operation.

Figure 6:
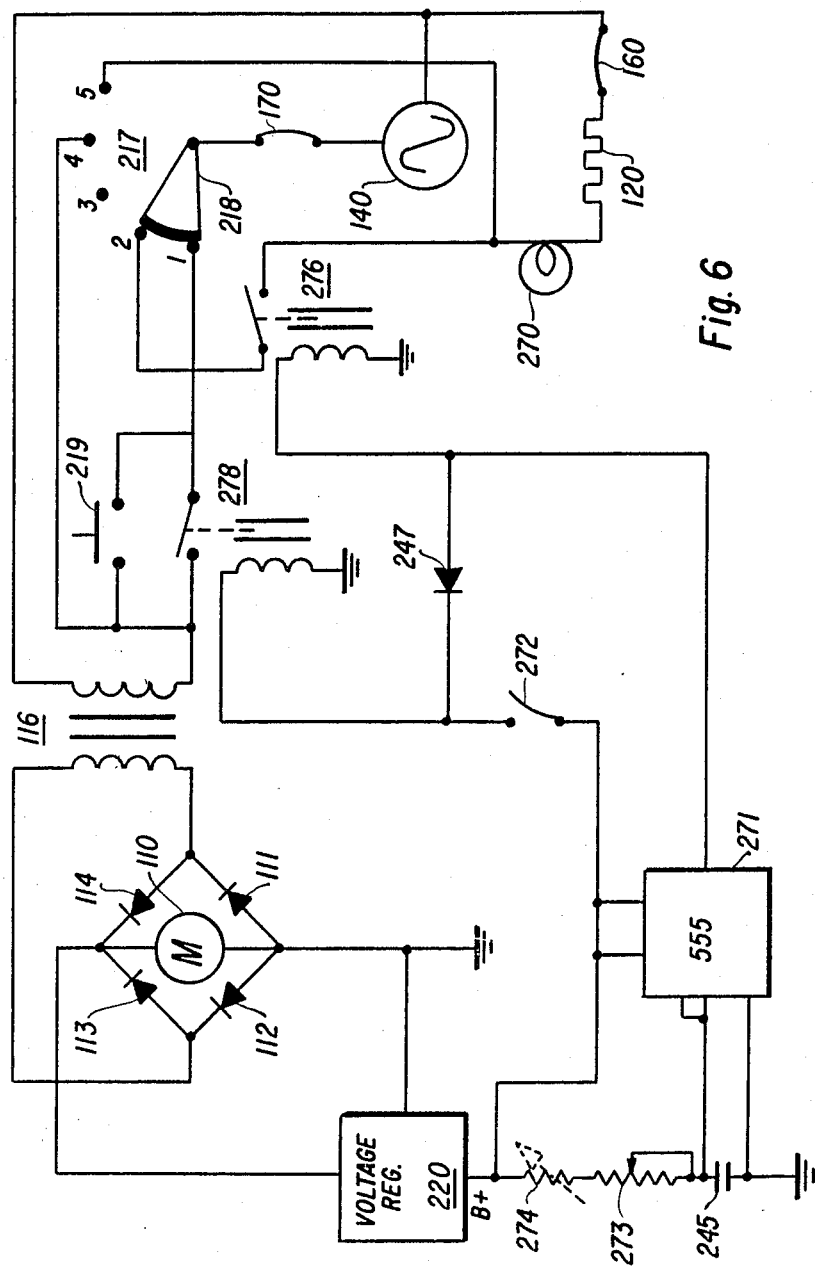
FIG. 6 is a schematic diagram illustrating various alternate circuit adaptations of the electronic timer control means of FIG. 5.

FIG. 6 illustrates various alternate circuit adaptations for the electronic timer controlled embodiment illustrated in FIG. 5. In FIG. 6, as in all of the figures in the patent, like reference designators indicate like components. Therefore, power source 140 and safety thermal cutout 170 are essentially the same as illustrated for all the other embodiments as is the motor 110, bridge rectifier 111 through 114, indicating lamp 270, primary heating element 120 and temperature control thermostat 160.

The master control switch 170 provides fully automatic operation, off, blower only, and blower and heater connections as previously described so that with sector contact 218 positioned as illustrated in FIG. 6, current will flow through step down transformer 116 to energize the motor 110 and apply approximately 24 volts DC to voltage regulator 220 via the full wave bridge rectifier comprised of diodes 111 through 114. In the illustrated embodiment, voltage regulator 220 provides a positive 15 volts to the timer circuit which is a type 555 timer controlled by the RC time constant network comprised of resistor 274, potentiometer 273, and capacitor 245.

If the temperature controlling thermostat 160 is not used, resistor 274 may be a temperature responsive resistance such as a thermister selected to automatically compensate roasting time for ambient temperature variation or it may be a potentiometer to permit manual adjustment of the timing to compensate for variances in ambient temperature.

If a roasting range of from 4 minutes 50 seconds to 9 minutes 40 seconds is desired, as suggested with respect to FIG. 5, 274 should be an 8.76 Megohm resistor, 273 should be a potentiometer having a range of from 0 to 8.85 Megohms, and 245 should be a 30 MF capacitor. With the preceding components, timer 271 will produce a positive output at pin 3 upon application of power to the system caused by depression of push-button switch 219 and the duration of the positive output will range from 4 minutes 50 seconds to 9 minutes 40 seconds depending upon the position of the wiper of potentiometer 273. The positive pulse is applied through blocking diode 247 to the coil of relay 278. This relay has a normally open set of contacts which is closed upon application of the positive pulse. Closure of the switch contact provide a bypass for push-button switch 219 so that the circuit becomes self holding in that primary power is applied to the primary of transformer 116 while relay 217 is energized. The positive pulse also energizes relay 278 which has a pair of normally open contacts that supply current through the indicator lamp 270, heating element 120 and oven temperature control thermostat 160.

The normally open thermostat 272 provides an alternate path for current to the coil of relay 278. Thermostat 272 is positioned where it will be responsive to the air exiting the oven, see for instance the suggested location of 272 in FIG. 2. The thermostat is calibrated to close at temperatures above 180° F. so that shortly after the oven begins functioning, the thermostat will close and provide a current source to maintain relay 278 closed. After the roasting period is over as signalled by timer 271 timing out, relay 276 is de-energized and the oven heater 120 is turned off. Relay 278 remains energized however due to the alternate energizing potential applied via thermostat 272. Thus the blower motor 110 will remain functioning until the temperature of the air exiting the oven falls below 180° F. This provides a positive control over the quenching portion of the cycle and eliminates the need for a second timer as was required in FIG. 5.

Figure 7:
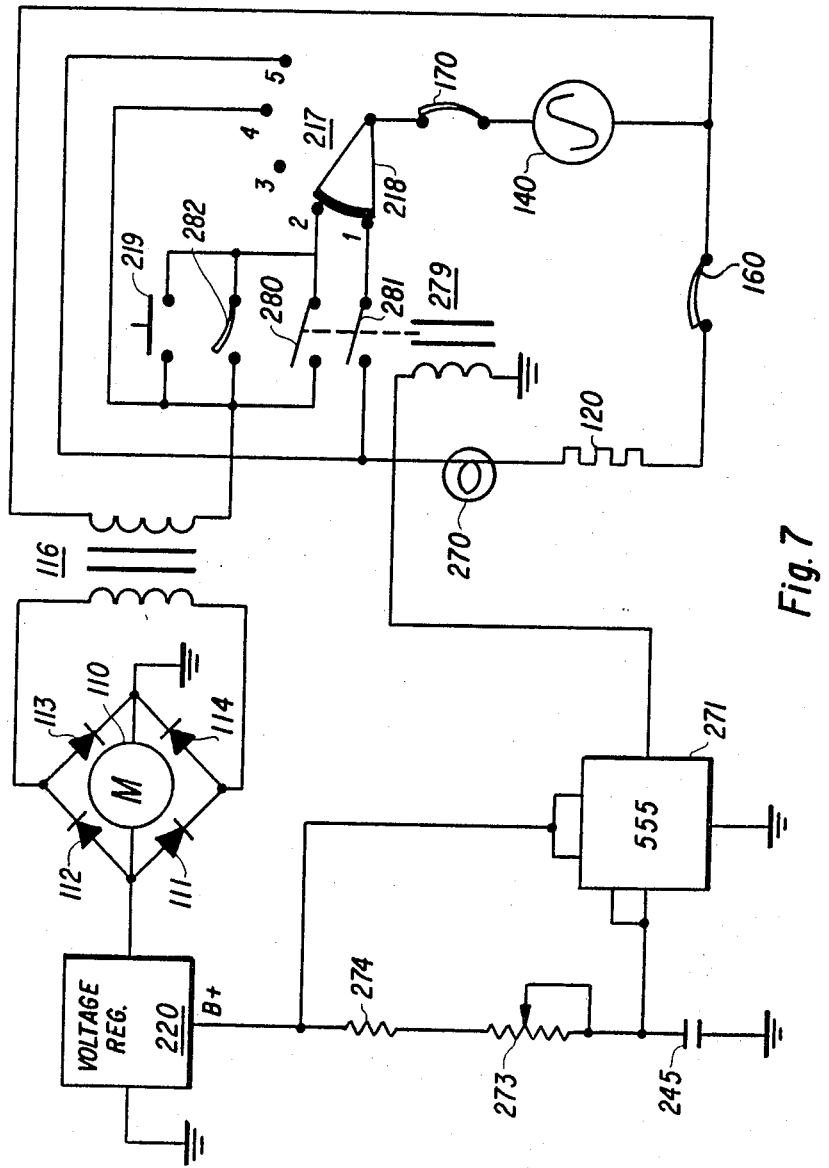
FIG. 7 is a schematic diagram illustrating a further adaptation of the electronic timer control of FIGS. 5 and 6.

The quench cycle controlling thermostat 272 of FIG. 6 may be a fairly light duty thermostat because the contacts are required to carry only a low voltage. However, by utilizing a slightly heavier duty thermostat, an electronic timer oven control circuit may be further simplified as illustrated in FIG. 7. In this embodiment, the various circuit components are identical to those illustrated in FIGS. 5 and 6 where like reference designators are used. Thermostat 272 of FIG. 6 is replaced by thermostat 282 in FIG. 7 and it couples AC current directly to the step down transformer 116 to eliminate the need for a separately controlled relay such as 278 in FIG. 6. In the embodiment of FIG. 7, a double-pole double-throw, normally open relay 279 is used to replace the two relays, 276 and 278 of FIG. 6.

The circuit illustrated in FIG. 7 functions identical to the embodiments illustrated in FIGS. 5 and 6 when in the manual mode. However, in the automatic mode as illustrated, a few differences occur. When push-button switch 219 is depressed, motor 110 and voltage regulator 220 are energized as explained in FIG. 6 and timer 271 produces a positive pulse controlled by the RC time constant as previously explained. This pulse energizes the coil of relay 279 which causes closure of the normally opened single-pole single-throw contact sets 280 and 281. Current to the primary heater 120 is applied through contact set 281 and control voltage to the regulator is supplied through contact set 280 after push-button switch 219 is released. Thermostat 281 is set to close at temperatures above 180° F. and provide a path for current to the blower motor after timer 271 times out and relay 279 is de-energized. Thermostat 271 is positioned so that it will be responsive to the heated air exiting the oven in exactly the same fashion as was used for thermostat 272 in the embodiment illustrated in FIG. 6.

Figure 9:
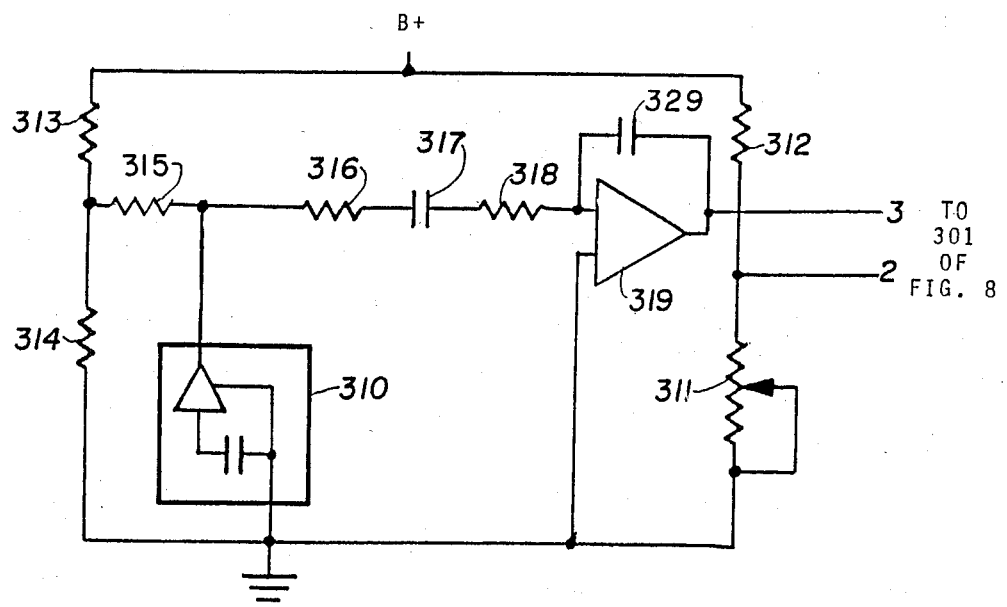
FIG. 9 is a schematic diagram illustrating a roast timer responsive to an audio function sensing means for controlling the coffee roaster illustrated in FIG. 8.
Figure 11:
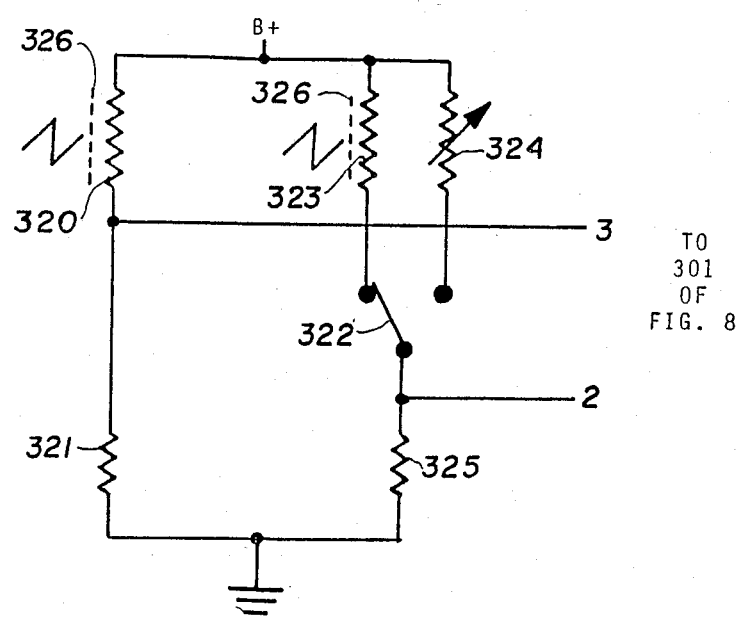
FIG. 11 is a schematic diagram illustrating a roast timer responsive to a light function sensing means for controlling the coffee roaster illustrated in FIG. 8.
Figure 10:
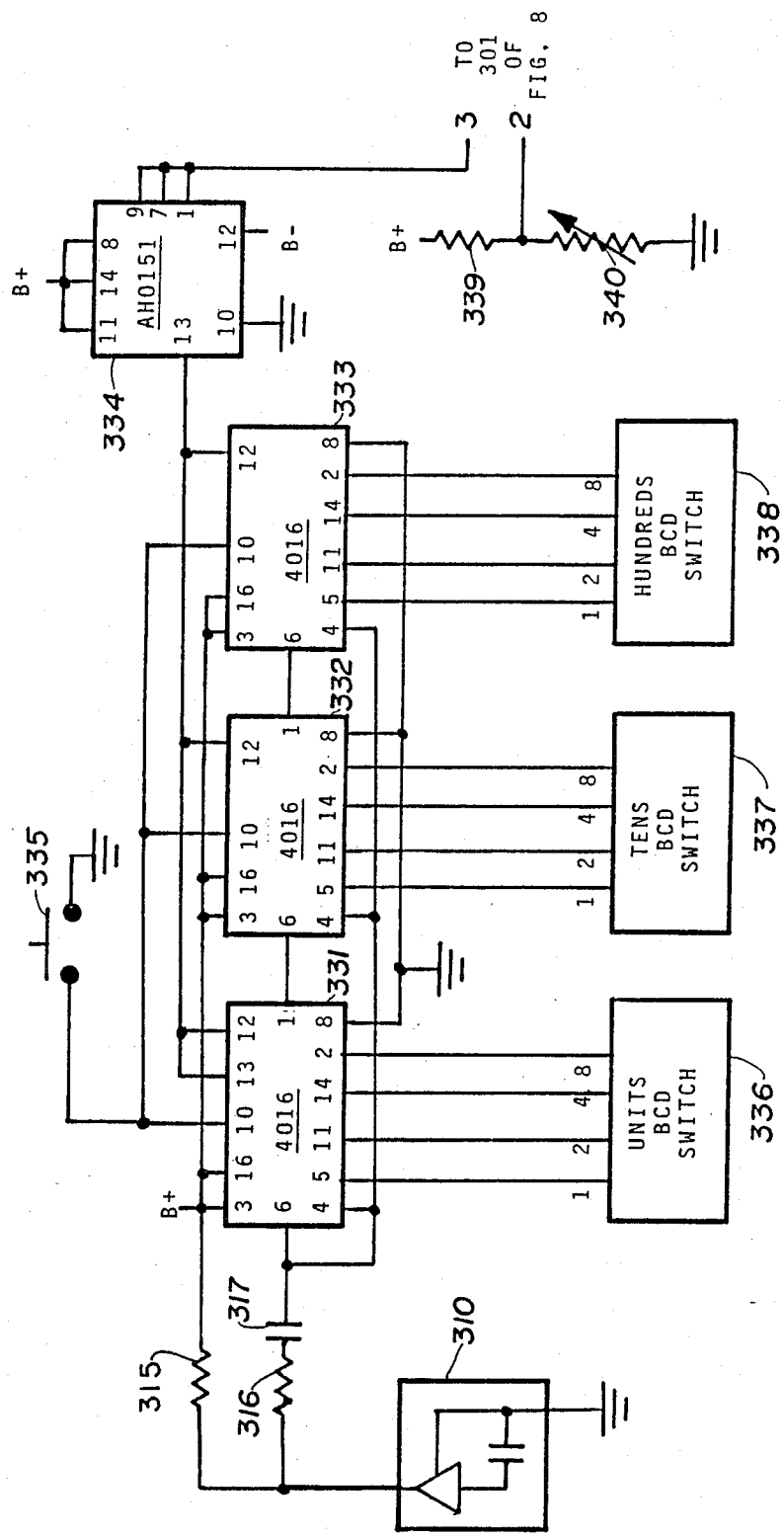
FIG. 10 is a schematic diagram illustrating a digital embodiment of the roast timer illustrated in FIG. 9.

Timers 131 of FIG. 4, 221 of FIG. 5, and 271 of FIGS. 6 and 7 provide an automatic time control means for the electric heater of the oven. The timing means, especially timers 221 or 271 may be replaced by a transducer means responsive to the charge in the oven. For instance, timers 221 or 271 may be replaced by a roast timer responsive to a parameter other than time, as illustrated by 300 of FIG. 8 which may be an audio means responsive to the crackle of roasting beans as illustrated in FIGS. 9 and 10 or an optical transducer responsive to the color of the charge in the roasting oven as illustrated in FIG. 11. In these embodiments, the oven is controlled by physical parameters and ambient temperature effects on waste time are present but compensation is automatic since the parameter controlling the heater is a function of the actual waste progression.

Figure 8:
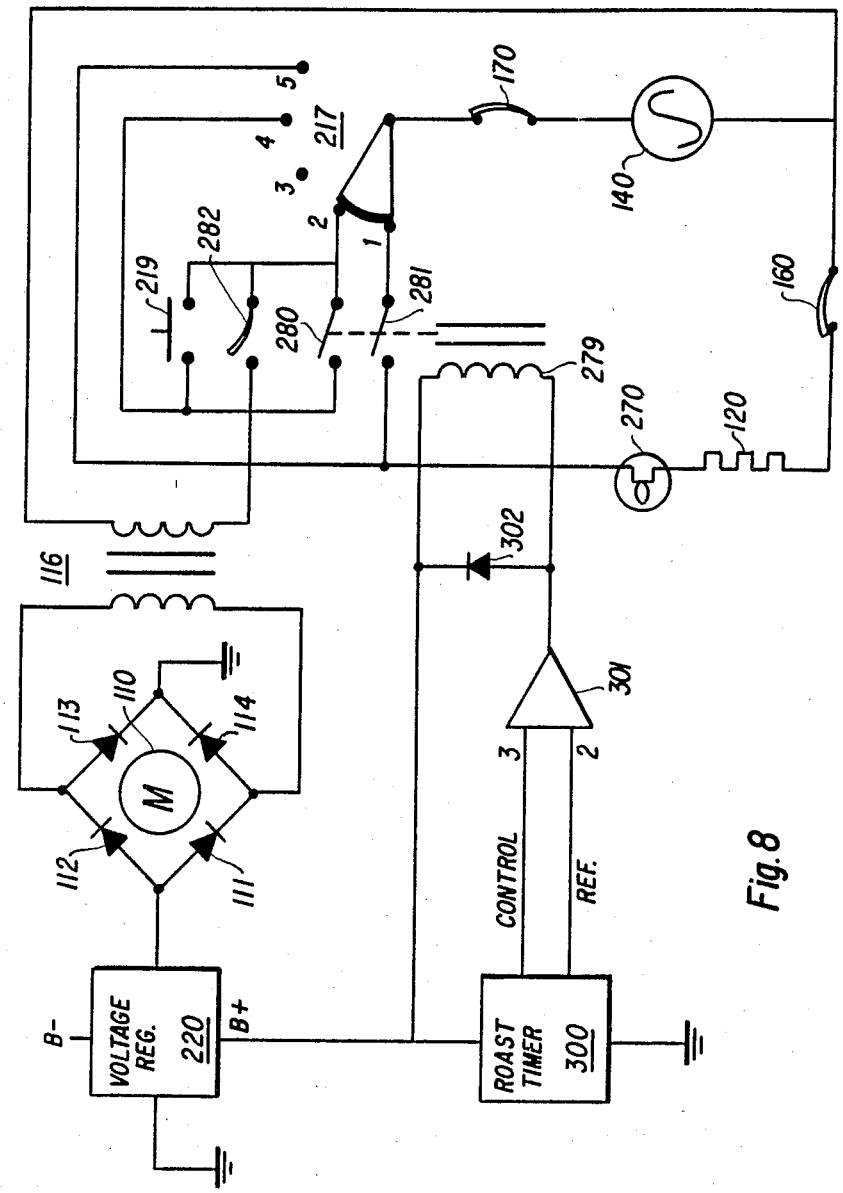
FIG. 8 is a schematic diagram illustrating a function responsive means for controlling the coffee roaster.

The basic motor and heater controls of FIG. 8 are identical to those utilized in FIG. 7 as may be apparent by the use of like reference designators to indicate identical components. The significant difference between FIGS. 8 and 7 is that a roast timer 300 is incorporated to provide control and reference voltages to a voltage comparator 301. In the illustrated embodiment, voltage comparator 301 is a type LM106 integrated circuit which has sufficient output to drive relay 279 directly. A positive reference voltage is applied to the positive input pin 2 and the control voltage is applied to the negative input pin 3. Thus at the start of a roasting cycle, pin 2 is more positive than pin 3 and the output of 301 is high. When the control voltage increases to the reference potential, the output of the voltage comparator 301 increases to B+ and relay 279 is de-energized. This opens the heater circuit but the blower remains on via thermostat 282 until the beans are quenched. Diode 302 is a 1N457 included in the circuit to eliminate hazards created for the integrated circuit by the back EMF of the coil of transistor 279 when the relay is de-energized.

Roast timer 300 of FIG. 8 may be any one of a variety of timers adapted to provide a control voltage and cause the circuit to function in a manner similar to that illustrated in the prior embodiments. However, the particular embodiment illustrated in FIGS. 8 lends itself to an adaptation wherein different physical parameters may be used to control the operation of the oven. For instance, FIG. 9 presents a detailed schematic of one embodiment of a roast timer adapted to be responsive to the sounds created by roasting coffee beans.

A microphone 310 of FIG. 9 is positioned relative to the roaster so that it will be responsive to noise generated by coffee beans as they crackle and explode during the roasting process. In the embodiment illustrated, 310 is an Electret condenser microphone such as that sold by Radio Shack under Catalog No. 270-090. This particular microphone requires a 1,000 Ohm output impedance matching resistance which is provided by 315 of FIG. 9. Resistors 313 and 314 form a voltage divider network which applies an optimum operating voltage across the microphone which, in the present instance is adjusted to be within the range of 2 to 10 volts to match the microphone requirements. If a different type of microphone is utilized, the circuit may be adjusted as required. Noise sensed by microphone 310 results in a varying potential applied to load resistor 316 which attenuates the normal motor noises and bean movement noises associated with the roasting function but allows the higher voltage spikes created by crackling of the beans to be coupled via capacitor 317 to operational amplifier 319.

Operational amplifier 319 includes a feedback capacitor 329 and input resistor 318 configured to cause the amplifier to function as an integrator whose output at pin 2 increases in proportion to the number of voltage spikes which pass through capacitor 317. The output of integrator 319 is applied as the control voltage input to pin 3 of voltage comparator 301 of FIG. 8.

Resistors 312 and 311 of FIG. 9 form a voltage divider network which produces the reference potential applied to pin 2 of the voltage comparator 301 of FIG. 8. The values of the resistances 311 and 312 are a function of the expected output of integrator 319 and therefore they should be selected so that the maximum potential at reference output 2 is approximately 60% of the potential sensed between resistors 313 and 314.

Resistor 311 of FIG. 9 provides control of the roast by adjusting the reference voltage applied to voltage comparator 301 of FIG. 8. In operation, the potential provided at the output of integrator 319 is a direct function of the number of beans which have snapped or popped during the roasting process and the coffee roaster is configured to function as follows:

With control selector switch 217 positioned as illustrated in FIG. 8, push-button switch 219 is depressed. This causes current flow through transformer 116 to energize motor 110 and voltage regulator 220 as previously explained. When voltage regulator 220 is energized, a regulated positive voltage is applied to the roast timer 300 of FIG. 8 and illustrated in detail in FIG. 9. The selected reference potential is applied to the positive input, pin 2 of voltage comparator 301 and relay 279 is energized because the control signal from integrator 319 is low. When the output of integrator 319 exceeds the voltage level of the reference potential, the output of voltage comparator 301 increases toward B+ and relay 279 is de-energized. This removes current from heater element 120 but because a bimetal switch 282 was closed by the heat of the roasting process, motor 110 continues to function until the charge in the oven has sufficiently cooled to the point where switch 282 opens. Diode 302 in the illustrated embodiment is a 1N457.

FIG. 10 is another embodiment of roast timer 300 wherein the timer is responsive to the noise created by the roasting beans. In this embodiment, the reference potential to the voltage comparator is set by resistors 339 and 340. This circuit is not normally adjustable by the operator and it is in the nature of a preset factory adjustment. The operator controls in the embodiment illustrated in FIG. 10 is comprised of three binary coded digital switches, 336, 337 and 338. These switches control a divider circuit, which in the illustrated embodiment is comprised of three cascaded MC4016 decade ripple down-counters. The counters may be reset via switch 335 which may be ganged with the power on switch 219 of FIG. 8 to ensure that the counter is reset at the beginning of a cycle. Microphone 310, impedance matching resistor 315, load resistor 316 and coupling capacitor 317 function in a manner similar to that described for the like components illustrated in FIG. 9. However, instead of accumulating the output pulses of capacitor 317 in an analog fashion, the counter comprised of integrated circuits 331 through 333 and their associated BCD switches count the individual popping noises created by each bean as the moisture inside that bean is explosively released. When the number of pops counted reaches the value set by switches 36 through 38, the output of the counter, which is applied to pin 13 of analog switch 334 which is a type AH0151, transitions from low to high. This transition of control input pin 13 of analog switch 334 causes the B+ voltage applied to pin 14 of the switch to be coupled to output pin 1. This applies a B+ voltage to control input pin 9 of analog switch 334 which in turn closes the switch comprised of input pin 8 and output pin 7. Thus the input pulse provided by the counter closes analog switch 334 which then functions as a self-holding relay to provide B+ to the control input of voltage comparator 301 of FIG. 8. This potential exceeds the potential set by the reference voltage divider network causing the relay to be de-energized as explained with respect to the operation of FIGS. 8 and 9.

When operating this embodiment, an operator determines the number of beans to be roasted and sets the switches of FIG. 10 accordingly, that is, if a light roast is desired, the switches should be set to represent approximately 10% of the beans in the oven charge so that roasting will be terminated when approximately 10% of the beans have popped. If a very heavy dark roast is desired, the switches may be set so that approximately 80% of the beans pop before the counter counts down and turns off the heater via analog switch 334 and voltage comparator 301. Thus any degree of roast may be accomplished through the use of switches 336 through 338. The same principle applies for determining the desired roast utilized in the analog system of FIG. 9, except in that case, the control knob which varies resistor 311 is calibrated to provide the range desired.

The roaster may be controlled optically by using the circuit illustrated in FIG. 11 for roast timer 301 of FIG. 8. In this embodiment, resistors 320 and 323 are photoconductive cells which have a high dark resistance which decreases for example from 5 megohms to 3K ohms in response to light if a VT-701 as produced by Vactec, Inc. is utilized. Thus photoconductive cell 320 and resistor 321 form a first voltage divider network which provides a control potential to voltage comparator 301 of FIG. 8 and resistor 325 and either photoconductive cell 323 or controllable resistor 324 as selected by switch 322 provide a reference potential to the voltage comparator which cause the voltage comparator to control the operation of the oven as described with respect to the embodiments illustrated in FIGS. 8 through 10. In the operation of the embodiment illustrated in FIG. 11, a coffee bean of the desired roast is placed in a control chamber where light reflected from its surface illuminates photoconductive cell 323 to set the reference potential for the voltage comparator 301. Photoconductive cell 320 is illuminated by light reflected from the beans in the oven chamber via fiber optics or similar means. Resistors 321 and 325 are selected so that the two voltage divider networks of which they are a part are balanced. Thus when the coffee beans in the oven reach the color of the coffee bean in the test chamber, the output of voltage comparator 301 drops to zero, the heating element is turned off and the quenching cycle begins as previously explained.

In the adjustment of the two voltage divider networks of FIG. 11 via resistors 321 and 325, the fact that the coffee beans continue to cook during the first portion of the quenching cycle is compensated for by causing the voltage developed by the voltage divider network comprised of photoconductive cell 320 and resistor 321 to be slightly lower than the voltage generated at the reference lead by photoconductive cells 323 and 325 for beans of the same color. Thus the relay will be turned off slightly before the beans have reached the desired roast indicated by the bean in the test chamber but the short roasting duration that occurs after the heater is turned off will bring the roast to the desired point. If desired, optical filters 326 may be employed to enhance the response of the photoconductive cells in the range of light reflected by the roasted coffee beans.

The embodiment illustrated by FIGS. 11 and 8 may be operated in a manual mode by placing switch 323 in the right hand position so that the reference voltage network is comprised of potentiometer 324 and resistor 325. Potentiometer 324 is selected to duplicate the range of photoconductive cell 323 so that any desired roast may be obtained without the need for a sample bean.

Figure 12:
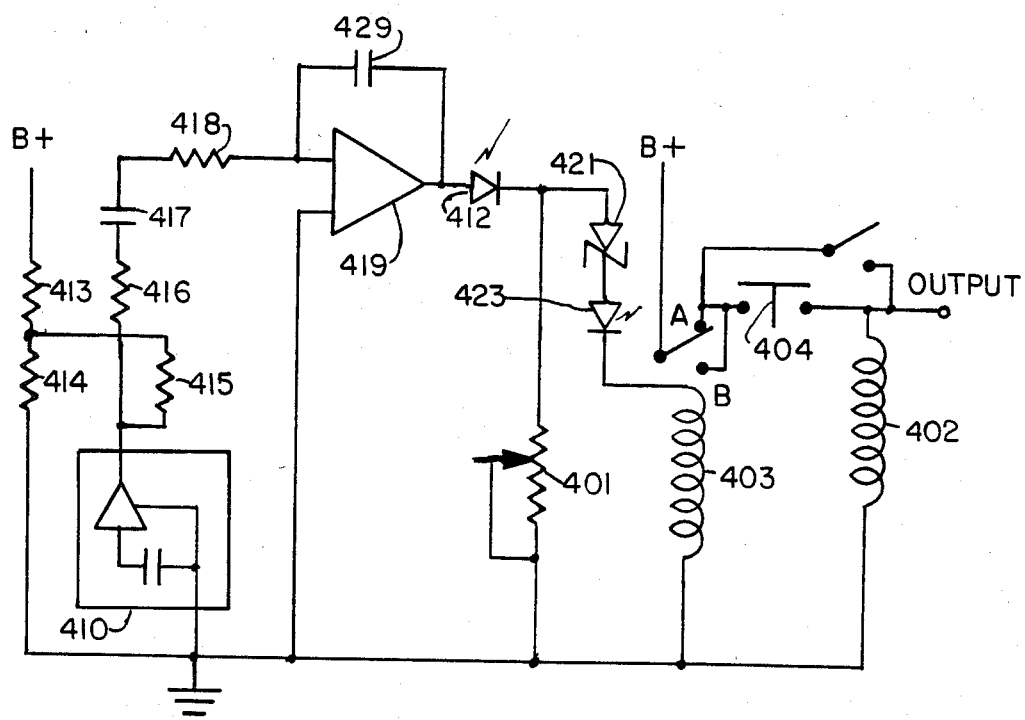
FIG. 12 is a schematic diagram illustrating a timer responsive to noise generated by the product being processed.

The audio responsive circuit illustrated in FIG. 12 may be used as an audio responsive control means for any electrically controlled cooking device such as a coffee roaster or popcorn popper. It includes a microphone 310 positioned relative to the controlled device so that it will be responsive to noise generated by coffee beans as they crackle or corn as it pops during the roasting process. In the embodiment illustrated, 410 is an electret condenser microphone such as that sold by Radio Shack under Catalog No. 270-090. This particular microphone requires a 1,000 Ohm output impedance matching resistance which is provided by 415 of FIG. 12. Resistors 413 and 414 form a voltage divider network which applies an optimum operating voltage across the microphone which, in the present instance is adjusted to be within the range of 2 to 10 volts to match the microphone requirements. If a different type of microphone is utilized, the circuit may be adjusted as required.

Noise sensed by microphone 410 results in a varying potential applied to load resistor 416 which attenuates the normal motor noises and food product movement noises associated with the roasting function but allows the higher voltage spikes created by crackling or popping to be coupled via capacitor 417 to operational amplifier 419. Operational amplifier 419 includes a feedback capacitor 429 and input resistor 418 configured to cause the amplifier to function as an integrator whose output increases in proportion to the number of voltage spikes which pass through capacitor 417. The value of capacitor 417 is selected so that relay 403 will be energized shortly after the cooking induced noise starts. A resistor, which may be a potentiometer, 401 is connected to the output of integrator 419. The value of this resistor is selected to prevent the voltage built up on capacitor 429 from dissipating between individual crackles or pops but still quickly discharge to ground upon the cessation of voltage spikes being applied to amplifier 419 so that the output of amplifier 419 will resemble a rectangular wave having a duration approximately equal to the duration of time that the product being cooked emits explosive popping sounds.

The output of amplifier 419 is applied through a threshold device, Zener diode 421, to a switching circuit which may be implemented by solid state switching devices such as flip-flops but in the exemplary embodiment of FIG. 12, relays are used to simplify the presentation. The switching devices include a normally opened relay 402 and a relay 403 having a single-pole double-throw set of contacts. Relay 403 is selected to have a reaction time significantly slower than relay 402. If flip-flop circuits are used instead of relays, a delay means may be incorporated in the equivalent of relay 403 to ensure that its switching will be slower than switch device 402. Zener diode 421 isolates the coil of relay 403 from the output of amplifier 419 until capacitor 429 is charged to a voltage level sufficient to energize the rely to prevent the relay coil drain from impeding the charging of the capacitor and to prevent chattering of the relay or other switching means during the charging process.

LED 412 provides an indication of the dissipation of the output of amplifier 419 and thereby enables adjustment of resistor 401. For instance, with resistor 401 set at its minimum value, LED 412 will flash for each pulse out of the amplifier. As the resistance of 401 is increased, the duration of the flash will increase and when the duration of each flash is increased to a duration longer than the period between pulses, the charge level on capacitor 429 will build until the threshold of Zener diode 421 is exceeded and the switching means energized. If the switching means is a relay, the resistance added to the circuit when the Zener diode conducts may discharge capacitor 429 below the threshold of the Zener diode, causing the relay to chatter. This situation is indicated by the flashing of LED 423 in the coil circuit of relay 403 and may be eliminated by further adjustment of resistor 401.

When the system is in the off state, the appliance power is applied through the pole contact and normally closed A contact of relay 403 to the pole contact of relay 402 and to normally opened push-button switch 404. When push-button 404 is depressed, relay 402 is energized and becomes self-holding through its normally open contact. This also provides power to the appliance or a control output such as might be used to control the circuit of FIG. 8 via differential amplifier 301 of that circuit. If the circuit of FIG. 12 is used in conjunction with the circuit of FIG. 8, push-button switch 404 is mechanically ganged to push-button switch 219 so that both relays 402 and 279 are energized with the depression of a single push-button.

When the food product being timed begins emitting audible sounds, the output of integrator amplifier 419 rises and causes relay 403 to be energized. This toggles the single-pole double-throw switch to the B contact. This has no apparent effect on the operation of the circuit because the toggling of the contact occurs faster than relay 402 can respond so that self holding relay does not drop out. When the popping sounds in the roasting or cooking device cease, the output of integrator amplifier 419 drops due to the bleeding effect of resistor 401. The RC time constant of capacitor 429 and resistor 401 are selected, as previously explained, so that the bleed down time of capacitor 429 is greater than the time period between individual pops emitted by the product being roasted once the popping phase of the cooking cycle reaches an intensity great enough to cause relay 403 to be energized. When relay 403 is de-energized as the result of capacitor 429 being discharged, relay 403 toggles from B to A. (In some applications the resistive load of relay coil 403 is sufficient and resistor 401 is not necessary.) A delay or dash pot means are included in relay 403 so that the toggling from B to A requires a time duration greater than relay 402 so the self-holding contacts of relay 402 open, turning off the power or control signal. It should be noted that it is of the utmost importance that the toggling of relay 403 from the A to the B position occurs faster than the reaction time of relay 402 but the reverse toggling from B to A occurs slower than the reaction time of relay 402.

Figure 13:
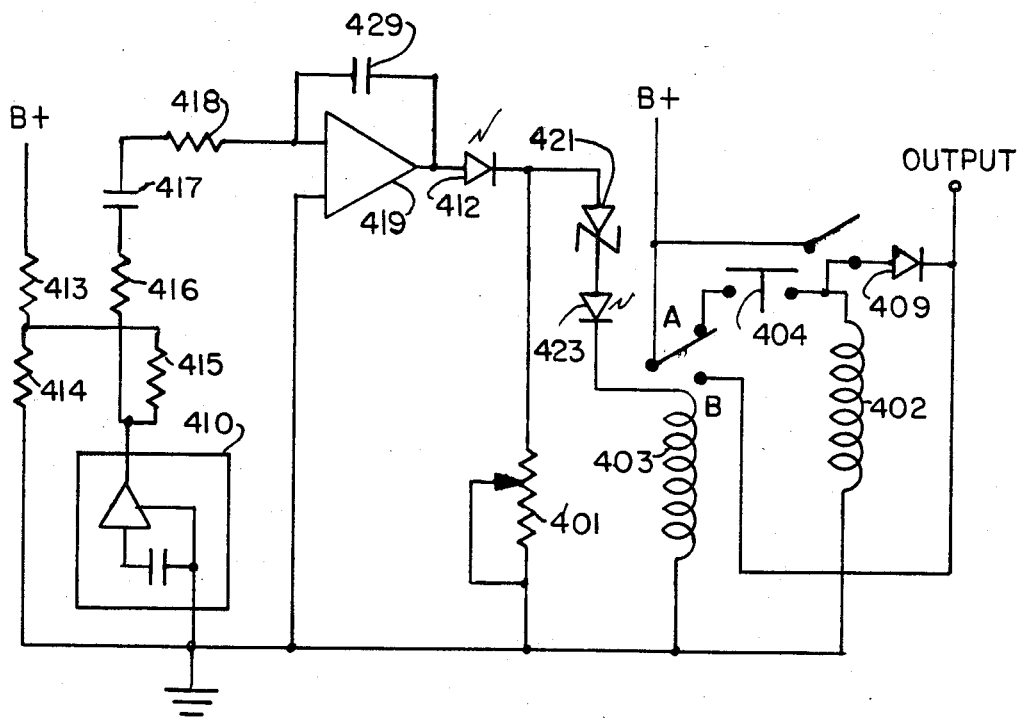
FIG. 13 is a schematic diagram illustrating a timer responsive to noise generated by the product being processed.

FIG. 13 illustrates a form of the circuit presented in FIG. 12 where the speed of the relays is not significant. In this embodiment, the B contact of relay 403 is connected to the control output instead of the pole contact of relay 402 and isolated from the coil of relay 402 by an isolation diode 409. Thus when relay 403 is energized, relay 402 is de-energized but power is still supplied to the load but now through the B contact of relay 403. When capacitor 429 discharges, relay 403 is de-energized and power is removed from the load and the circuit resumes its normal off state.

Figure 14:
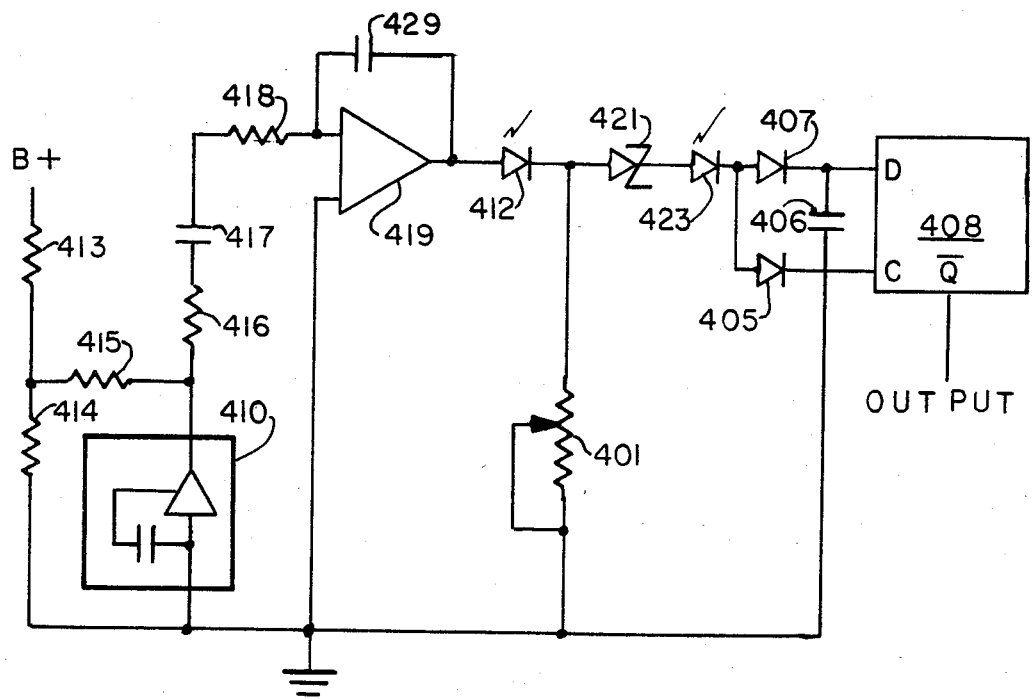
FIG. 14 is a schematic diagram illustrating a timer responsive to noise generated by the product being processed.

FIG. 14 illustrates an alternate embodiment where solid state means are utilized to perform the switching functions of relays 402 and 403 of FIG. 12. For instance, relays 402 and 403 may be replaced by a JK level-triggered flip-flop such as might be found in a 7473 type integrated circuit and identified in FIG. 14 as 408. In this device, when the system is energized, the output of amplifier 419 is low, putting a low input at D of the flip-flop and a high input at C via inverter 405. This results in the $\overline{Q}$ output being high and the control system or appliance is energized. Because flip-flop 408 is a level-triggered JK flip-flop, the output at $\overline{Q}$ changes to reflect the input at D only during clocking which occurs only when the C or clock input goes positive. Thus when the output of integrator amplifier 419 goes positive when the popping sounds start, the D input of flip-flop goes positive but due to inverter 405, the clocking input goes negative and the output at $\overline{Q}$ remains positive. When popping in the oven ceases, the output of integrator amplifier 419 drops and the clocking input immediately rises and sets the $\overline{Q}$ output to the inverse of the D input. Capacitor 406, isolated by diode 407 holds the D input of flip-flop 408 positive for a brief period after the output of integrator 419 dropped. Therefore, when the output of integrator 419 drops, the output at $\overline{Q}$ is toggled from high to low and the system is turned off.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A method for controlling the roasting duration of a food product, comprising the steps of:
turning on a heating source for said food product; sensing when the food product begins emitting sounds of a predetermined magnitude; and
turning off said heating source when the level of said sound from said food product decreases below a predetermined magnitude.

2. A method of controlling the roasting of a food product as defined in claim 1, including the step of delaying turning off said heating source for a predetermined time after said decrease of sound from said food product.

3. A method for controlling the roasting duration of a food product, comprising the steps of:
turning on a heating source for said food product;
producing a heating source control function when the food product begins emitting sounds of a predetermined magnitude;
maintaining said control function as long as said food product continues to emit said sounds;
terminating said control function when the level of said sound from said food product decreases below a predetermined magnitude; and
turning off said heating source when said control function is terminated.

4. A method for controlling the roasting of a food product as defined in claim 3, including said step of maintaining said control function as long as said food product continues to emit said sounds includes the step of:
integrating signals produced by sound responsive means; and
said step of turning off said heating source when the level of sound from said food product decreases includes the steps of:
using a signal produced by said integration as a control means for controlling the termination of said roasting process; and
terminating said roasting process when said integration signal decreases from a predetermined achieved level to a lower level.

5. A method of controlling the roasting of a food product as defined in claim 3, including the step of delaying turning off said heating source for a predetermined time after said decrease of sound from said food product.

6. A method for controlling the roasting of a food product as defined in claim 5, wherein said step of maintaining said control function as long as said food product continues to emit said sounds includes the step of:
integrating signals produced by sound responsive means; and
said step of turning off said heating source when the level of sound from said food product decreases includes the steps of:
using a signal produced by said integration as a control means for controlling the termination of said roasting process; and
terminating said roasting process when said integration signal decreases from a predetermined achieved level to a lower level.

* * * * *